No. 852,378.  
PATENTED APR. 30, 1907.

C. N. DAVIS, DEC'D.  
O. E. TEALE, ADMINISTRATOR.  
DECORTICATING MACHINE.  
APPLICATION FILED JAN. 17, 1906.

6 SHEETS—SHEET 3.

WITNESSES:  
James F. Duhamel  
J. Weiberg

INVENTOR  
Charles Norman Davis  
BY  
Fred L. Packer  
ATTORNEY

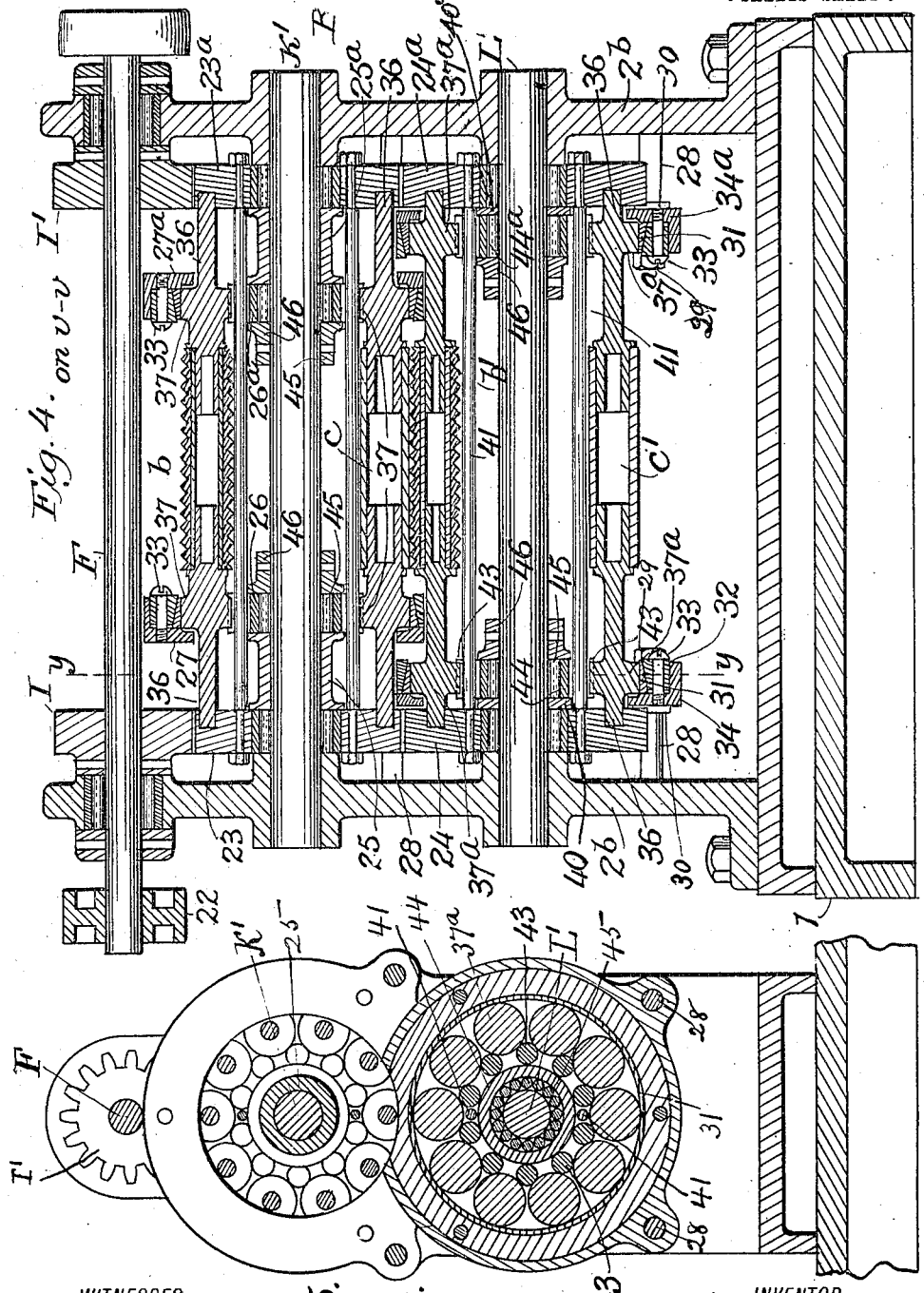

No. 852,378. PATENTED APR. 30, 1907.
C. N. DAVIS, DEC'D.
C. E. TEALE, ADMINISTRATOR.
DECORTICATING MACHINE.
APPLICATION FILED JAN. 17, 1906.
6 SHEETS—SHEET 5.
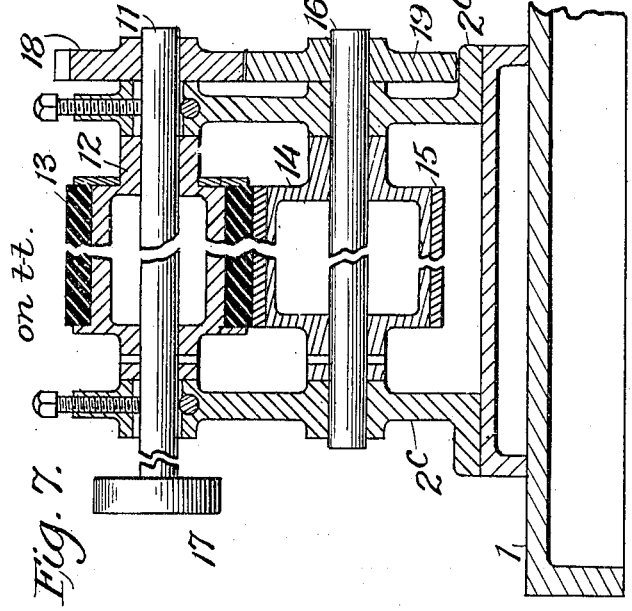
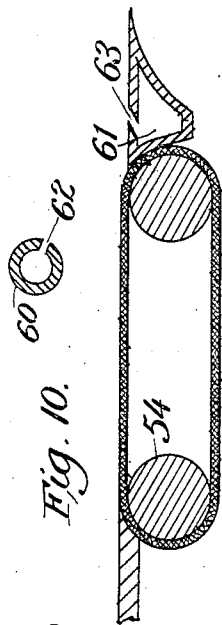
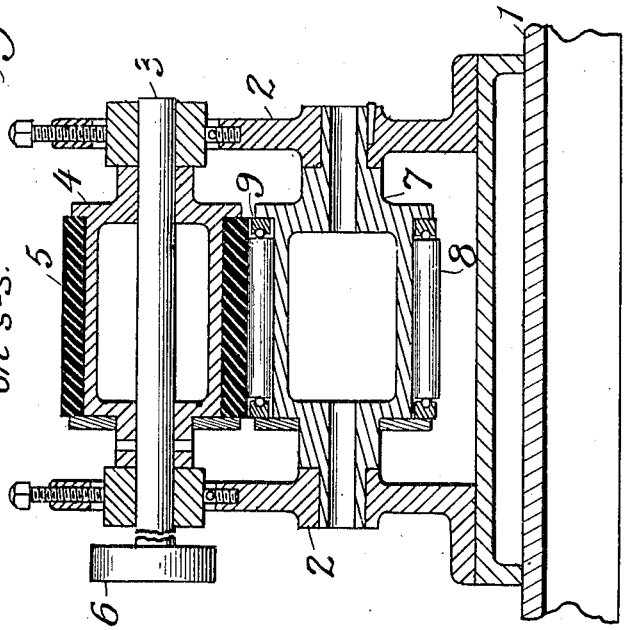
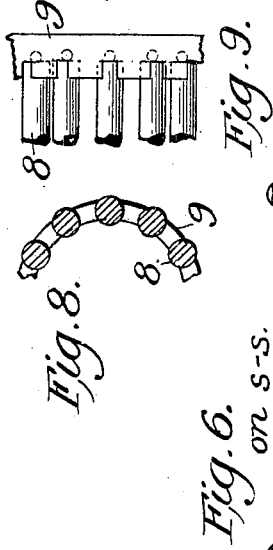
WITNESSES:
James F. Duhamel
J. Heiberg
INVENTOR
Charles Norman Davis
BY
Fred E. Täcker
ATTORNEY No. 852,378. PATENTED APR. 30, 1907.
C. N. DAVIS, DEC'D.
C. E. TEALE, ADMINISTRATOR.
DECORTICATING MACHINE.
APPLICATION FILED JAN. 17, 1906.
6 SHEETS—SHEET 6.
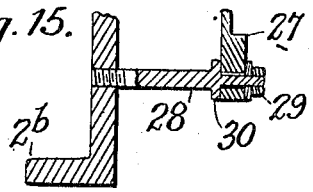
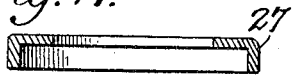
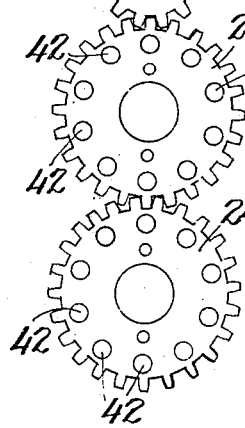
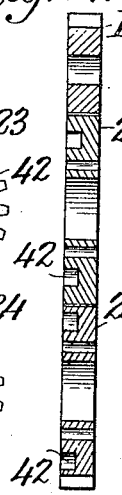
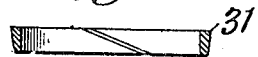
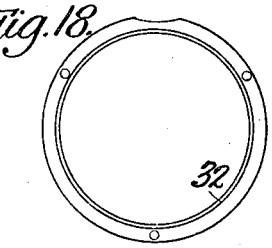
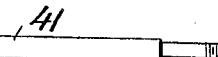
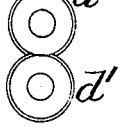
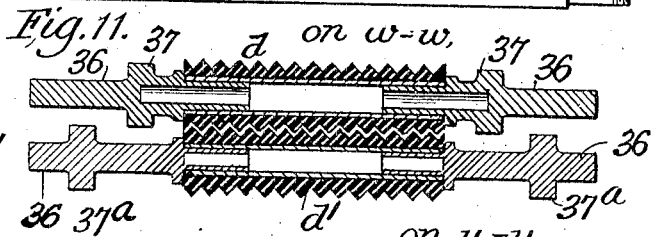
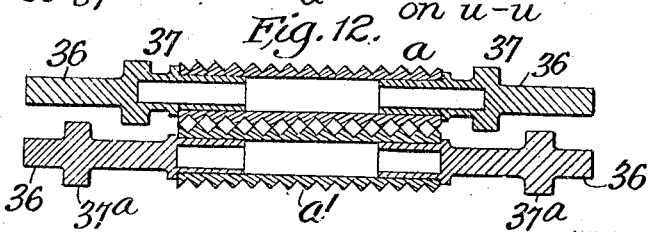
WITNESSES:
James F. Duhamel.
J. Huberg
INVENTOR
Charles Norman Davis
BY
Fred G. Dieterich
ATTORNEY
THE NORRIS PETERS CO., WASHINGTON, D. C.

UNITED STATES PATENT OFFICE.

CHARLES NORMAN DAVIS, OF NEW YORK, N. Y.; CHARLES E. TEALE, ADMINISTRATOR OF SAID DAVIS, DECEASED, ASSIGNOR TO INTERNATIONAL FIBRE COMPANY, OF PORTLAND, MAINE, A CORPORATION OF MAINE.

DECORTICATING-MACHINE.

No. 852,378.  Specification of Letters Patent.  Patented April 30, 1907.

Application filed January 17, 1906. Serial No. 296,475.

*To all whom it may concern:*

Be it known that I, CHARLES NORMAN DAVIS, a citizen of the United States of America, and a resident of the borough of Brooklyn, city of New York, county of Kings, and State of New York, have invented certain new and useful Improvements in Decorticating-Machines, of which the following is a specification.

My present invention relates to certain novel and useful improvements in decorticating machines or machines for separating fiber. It is intended for use with various different growths of fiber, such for instance as Pita fiber, Mexican fiber, sisal, ramie, jute, &c.

The invention has for its objects the production of a machine for more effectively dividing or stripping the leaves of the fiber into long threads, filaments, or strings, so as to separate the fiber from the pulp of the leaves or stalks; and the invention consists essentially in the combination, construction and arrangement of the various parts and in numerous details thereof, substantially as hereinafter described and claimed.

Figure 1:
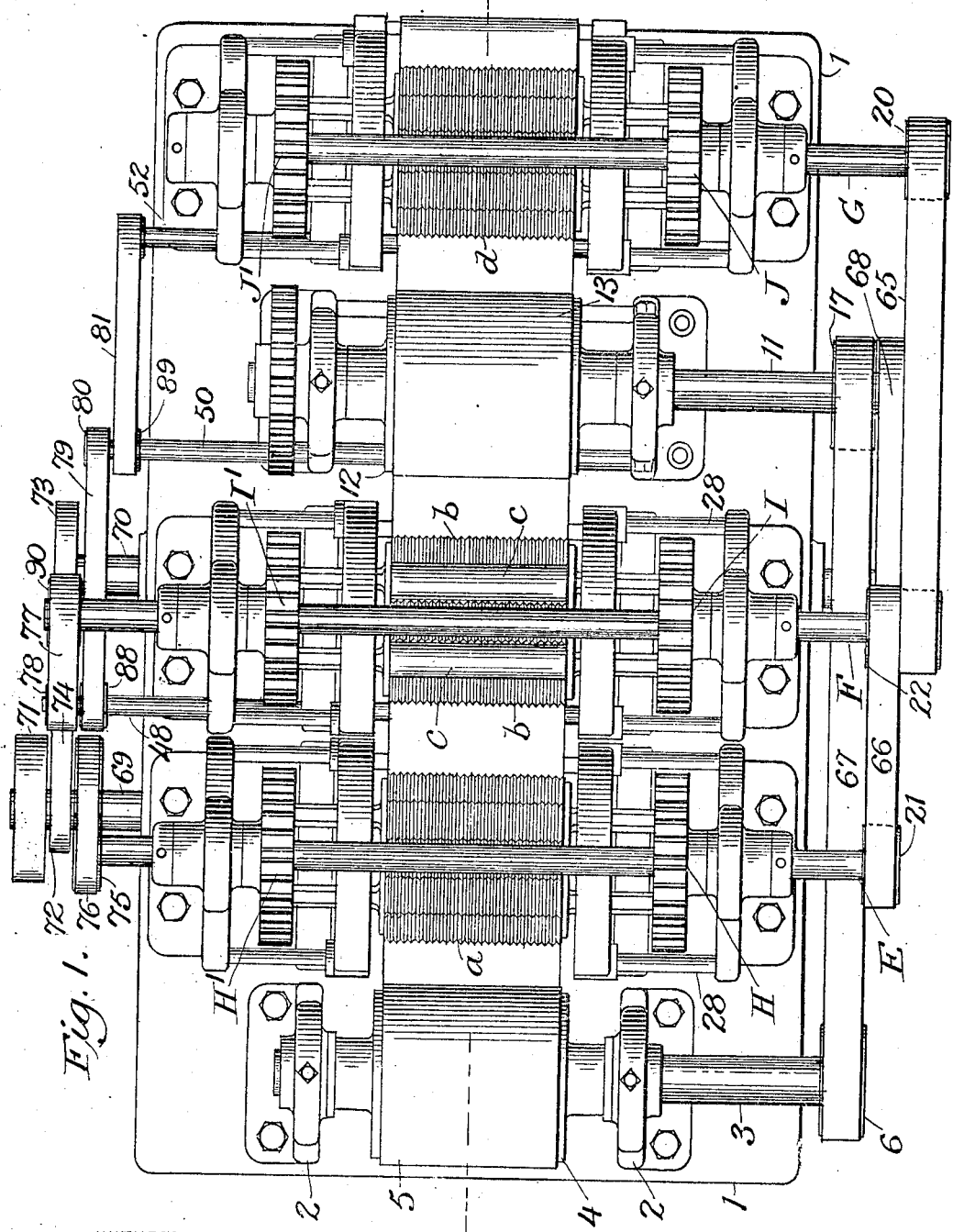
Figure 2:
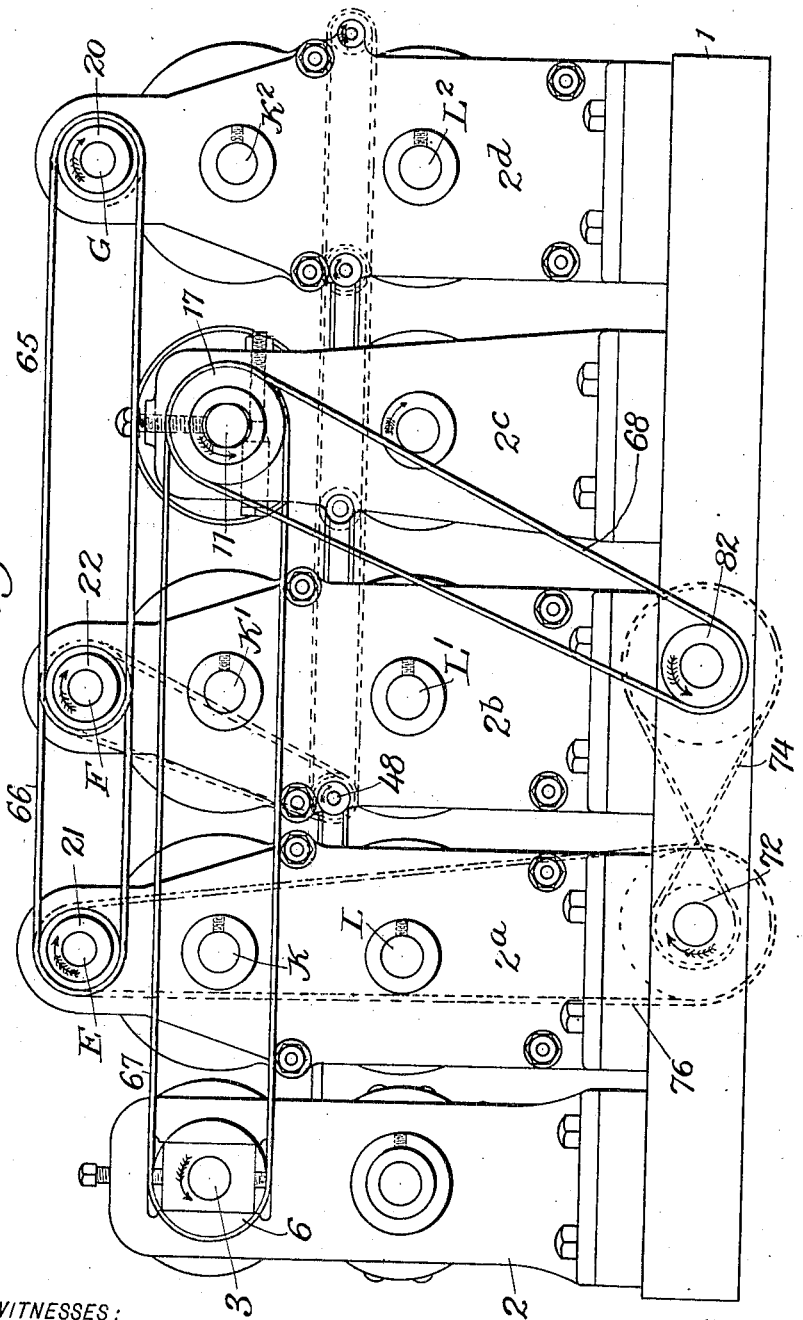
Figure 3:
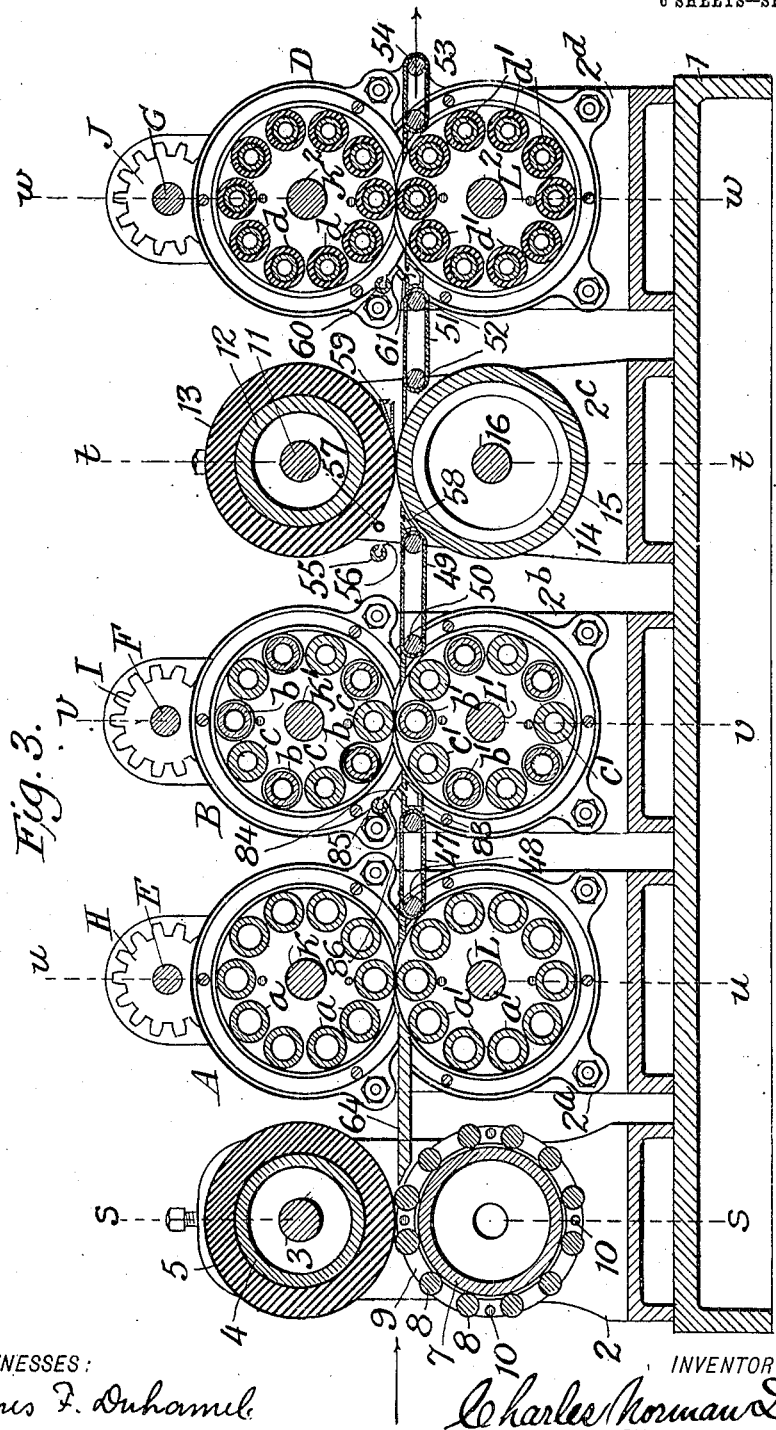

In the annexed drawing illustrating my invention: Figure 1 is a top plan view of my improved decorticating machine. Fig. 2 is a side elevation of the same. Fig. 3 is a longitudinal section on the line $x$ $x$ of Fig. 1. Fig. 4 is a transverse section on the line $v$ $v$ of Fig. 3. Fig. 5 is a cross section of that part of the machine represented in Fig. 4, taken on the line $y$ $y$ of Fig. 4. Fig. 6 is a transverse section on a different scale on the line $s$ $s$ of Fig. 3. Fig. 7 is a transverse section similar to Fig. 6 and taken on the line $t$ $t$ of Fig. 3. Fig. 8 is a sectional detail, and Fig. 9 a partial side view of the feeding and bearing drum whose surface is formed of freely turning rollers, the same being situated at that end of the machine into which the material is first introduced. Fig. 10 is an enlarged sectional detail of one of the endless conveyers located adjacent to the stripping rollers for transferring the material to the next operation. Fig. 11 is a detail sectional view of a roller couple consisting of two co-acting stripping rollers, on the line of $w$ $w$ of Fig. 3, and represents the interlocking function of the co-operating threads of these two rollers. Fig. 12 is a similar view in section of a roller couple consisting of two rollers on the line $u$ $u$ of Fig. 3 and indicates the edges of the threads in contact. Fig. 13 is a view of one of the trains of gears for driving the stripping rollers. Fig. 14 is a cross section of the same. Fig. 15 is a sectional detail of the means for supporting one of the stationary frames or casings. Fig. 16 is a side view and Fig. 17 is a cross section of one of the stationary frames at the ends of the stripping rollers. Fig. 18 is an edge view and Fig. 19 a cross section of one of the bevel-faced rings inserted in the frame shown in Figs. 16 and 17. Fig. 20 is an edge view and Fig. 21 a sectional view of a bevel ring having a straight inside edge, which ring provides a friction surface for the operation of the friction rings on the stripping rollers. Fig. 22 is a detail view of one of the tie rods. Fig. 23 is an end view of the parts shown in Fig. 11. Fig. 24 is an end view of the parts shown in Fig. 12.

Like numerals of reference designate like parts throughout the different figures of the drawing.

1 denotes the main horizontal base of the frame of my improved decorticating machine, which base may obviously be of any shape, size or formation. The rest of the main frame may also be adapted to suit the convenient arrangement therein and therewith of the several mechanical elements constituting the machine, and I reserve the liberty of building this frame in any desired way. A convenient form, however, consists of lateral frames mounted on the base 1, or, to describe the same more explicitly, a series of lateral vertical frames, or pairs of frames, supported on base 1.

In the present specimen of my machine, which is offered for explanatory purposes, but with no idea that I am to be restricted thereto, I employ at one end of the machine the side frames 2, 2 which support the feed devices. Adjoining these I place the parallel upright frames $2^a$, $2^a$, which sustain the first group of decorticating rollers. Next come the parallel uprights $2^b$, $2^b$ which support the second group of decorticating rollers. Next, and likewise on base 1, are the parallel upright frames $2^c$, $2^c$, in which are arranged the squeezing rollers; and lastly, at the end of the machine, are the upright frames $2^d$, $2^d$ for supporting the third group of decorticating rollers. Of course these pairs of uprights or frames may be more or less distinct from each other as indicated and described, being connected only by the common base 1, or they may be tied together or united in any other fashion, it being my purpose to build these supporting parts of the frame in any manner that will subserve the best results.

Journaled in the upright frames 2, 2 is a horizontal shaft 3 of a roller 4, having thereon a rubber or other elastic or yielding surface 5, said roller being a feed roller and serving to feed the leaves or stalks of the plant straight into the machine. See Figs. 3 and 6. The shaft 3 is provided with a pulley 6 by which it is rotated. Also supported in the two uprights 2, 2 directly below the feed roller is a feeding and bearing drum, the surface of which is formed of freely turning rollers. This is shown in Figs. 3 and 6, and in greater detail in Figs. 8 and 9. It consists essentially of a stationary cylinder 7, supported in the frames 2, 2, around which cylinder is a cage composed of rollers 8 carried loosely at their ends in rings 9, said rings encircling the cylinder 7 and revolving thereon, there being preferably balls at the ends of the rollers and the entire bearing being self-contained and in one combination. The rings 9 are held together by the horizontal tie-rods 10. The fiber leaf or stalk is fed between the rubber-faced feed roller 4 and the roller-surfaced drum, said roller working close to the drum, and thus the two constitute together a feeding device or couple for carrying the fibrous material straight into the machine and pressing and flattening it before it is delivered to the decorticating rollers. The combination of the roller and the drum makes a successful feeder, for the leaf of the fiber will run straight through at a high speed, caused by the rubber sinking into the spaces between the rollers of the bearing, and, as these rollers are horizontal, and reverse truly, the rubber roller will cause the leaf to be fed straight, and if it should start crooked in any way, it will be immediately straightened.

Before proceeding to describe the decorticating rollers I will next explain the couple of squeezing rollers, situated beyond the first and second groups of decorticating rollers, because of their partial similarity in construction and arrangement to the feeding couple, which I have just explained. In the side frames $2^c$, $2^c$ is journaled a shaft 11 of a roller 12 similar to the roller 4 and provided with a rubber or other elastic surface or facing 13, similar to the rubber surface 5. Below this roller 12 is a drum 14 having a metal cylinder 15, of brass or other suitable metal, surrounding it, said drum being supported on a shaft 16 which is journaled at its ends in the side frames $2^c$. The object of this couple of squeezing rollers, consisting as I have described, of the yielding upper roller and the lower drum, is to receive the threads or strands of fiber after their formation in the decorticating appliances through which they have passed before delivery to this couple, and assist in cleaning them, extracting the juice from the pulp and fiber strands leaving them comparatively dry and in a condition to be completely separated by the pounding action of the remaining group of decorticating rollers. The sectional view of Fig. 7 indicates the relative location of the surfaces of the upper yielding roller and the lower drum. The shaft 11 of the upper roller 12 has thereon a pulley 17 by which motion is communicated to said upper roller. Likewise on the shaft 11 is a gear wheel 18 which meshes with a gear wheel 19 on the shaft 16 of the drum 14, whereby said drum is driven, for as the upper gear 18 drives the lower gear 19 the two squeezing cylinders are positively actuated in opposite directions in such a manner that the strands of fiber introduced between them from the second group of decorticating appliances will be fed forward toward another and third group of decorticating appliances.

I will now explain the decorticating appliances, or in other words the means for stripping and separating the leaves or stalks of the fibrous plants into shreds or strips. Said means consist essentially and primarily of a circular set or series of positively-actuated rollers supported revolubly so that each roller may partake of a double movement, one being the revolution of the series of rollers about a common center, and the other a revolution of each roller independently on its own axis, the individual revolution being in a direction the reverse of that of the series revolution; and in carrying the invention into effect, I provide an upper circular series of rollers and a lower circular series, one being vertically beneath the other, and the rollers of one set being in close proximity to the rollers of the other set, so that said rollers will successively act jointly upon fiber passing between them. An upper series of rollers and a lower series of rollers together constitute a roller mechanism. Although a single roller mechanism of this character produces excellent results, yet in order to secure the very best results it is found preferable to multiply as many times as may be desirable, the number of these upper and lower sets or series of rollers, that is to say, to multiply the number of roller mechanisms, to permit a corresponding number of operations to be performed upon the fiber.

In the present example of my machine, as illustrated in the drawings, I have portrayed, between the feed couple and the squeezing couple, two of these sets or series of stripping rollers, and another set of the same style of rollers is placed at the right hand end of the machine to receive the material which leaves the squeeze couple. Some of the rollers are provided with a series of parallel circular grooves separated by circular projections or ribs, these ribs being more or less sharp, if desired, but, in lieu of the parallel circular grooves, the rollers may be provided with a screw-thread groove and rib. Some of the rollers are plain, without grooves. Some are of brass or other suitable metal, and others are of rubber or other yielding material. Some of the metallic rollers are grooved and some plain. Each of the circular series may contain as many of these roller as desired, ten being a convenient number, but I am not limited thereto. Referring to any two rollers, one of the upper set and one of the lower set, when the two are co-acting with each other at any particular moment, I denominate such rollers a roller couple, and in the practice of the invention this couple may consist of two grooved or threaded rollers of metal, or one grooved and one plain roller of metal, or two grooved rollers of rubber or yielding material, or any other desired collocation or assortment of rollers, and said rollers when grooved may have the edges of their ribs in contact or nearly so, or the ribs may interlock. In short, it may be said that there is a wide diversity in the form, construction, application and illustration of these rollers. The central idea, however, is at all times that of having an upper circular series and a lower circular series, each roller thereof partaking of a double motion. Each time two rollers come opposite each other the roller couple operates on the fiber to break and pound the same and disintegrate the strands from the pulp and other matter and provide the fibrous divisions which it is the object of the machine to manufacture.

I have already said that in the present example of my invention I perform three decorticating or stripping operations upon the plants by means of three separate roller mechanisms, each consisting of an upper circular series of rollers and a lower circular series of rollers actively co-operating with each other and receiving the material between them. These three roller mechanisms, as I term them, are situated, as stated, two of them between the feed couple and the squeeze couple, and designated A and B, and the third situated at the end of the machine so as to receive the material from the squeeze couple, and being designated D. The roller mechanism A consists of an upper circular series of rollers $a$ and a lower circular series of rollers $a'$. The roller mechanism B consists essentially of an upper circular series of rollers $b$ alternating with rollers $c$ and a lower circular series of rollers $b'$ alternating with rollers $c'$. The roller mechanism D consists of an upper circular series of rollers $d$ and a lower circular series of rollers $d'$. All these rollers $a$, $a'$, $b$, $b'$, $c$, $c'$ and $d$, $d'$ perform in the main the same function and are substantially equivalent to each other, differing only in the character of their surfaces, some being grooved and some smooth, some being of one material and some of another, in order to achieve the best results in practice, and I reserve the liberty of varying the precise form and character of the various rollers which constitute these roller mechanisms, as may be required to suit the needs of different cases.

I will now proceed to describe in detail the other mechanical features of the different roller mechanisms. Referring to the decorticating appliance A which performs the first decorticating operation, K denotes a stationary horizontal shaft, which is supported in the side frames $2^a$, $2^a$ and is the central axis around which the circular series of rollers $a$ revolves. Immediately below rod K is another rod L, which is similarly supported in the side frames $2^a$, $2^a$ and forms the axis around which the lower circular series of rollers $a'$ revolves. Vertically above the two rods K, L is a rotary shaft E, which is journaled in the upper ends of the vertical frames $2^a$, and this shaft carries thereon a pinion H near one of the frames $2^a$, and a pinion H' near the other frame $2^a$, and also at one end outside the frame $2^a$, a pulley 21. Referring to the roller mechanism B which performs the second decorticating operation, K' denotes a stationary horizontal rod which is supported in the side frames $2^b$, $2^b$ and is the axis around which the circular series of rollers $b$ and $c$ revolves. Immediately below rod K' is another rod L' which is similarly supported in the side frames $2^b$, $2^b$ and is the axis around which the circular series of rollers $b'$, $c'$ revolves. Vertically above the two rods K' and L' is a shaft F, which is journaled in the upper ends of the vertical frames $2^b$, and this shaft carries thereon a pinion I near one of the frames $2^b$ and a pinion I' near the other frame $2^b$, and also at one end outside the frame $2^b$ a pulley 22. Referring to the roller mechanism D which performs the third decorticating operation, $K^2$ denotes a stationary horizontal rod which is supported in the side frames $2^d$, $2^d$ and forms the axis around which the upper circular series of rollers $d$ revolves. Immediately below rod $K^2$ is another rod $L^2$ which is similarly supported in the side frames $2^d$, $2^d$ and constitutes the axis around which the lower circular series of rollers $d'$ revolves. Vertically above these two rollers $K^2$ and $L^2$ is a shaft G which is journaled in the upper ends of the vertical frames $2^d$, $2^d$, and this shaft carries thereon a pinion J near one of the frames $2^d$ and a pinion J' near the other frame $2^d$, and also at one end outside the frame $2^d$ a pulley 20.

The means for supporting the various sets of rollers and imparting to them the double revolution spoken of, that is to say, the series revolution and the individual revolution, is substantially the same in each of the roller mechanisms A, B and D, and a description of the means in one of these mechanisms will be sufficient to understand the arrangement of all of them. The sectional view in Fig. 4 is taken centrally through the roller mechanism B on the line $vv$ of Fig. 3, and in explaining the supporting and driving means for the rollers, I will make special reference to Fig. 4 and the details of the mechanism therein. Loosely mounted on the rod K′ (as also on the rods K and K²) near one end is a gear wheel 23, serving also as a roller-supporting frame, which gear is in mesh with the pinion I, and near the other end a gear wheel 23$^a$ which is in mesh with the pinion I′. Gears 23 and 23$^a$ are revoluble on the rod K′, friction being obviated and ease of revolution permitted by the use of ball or roller bearings, as indicated. Loosely mounted on the rod L′ and revoluble thereon is a gear wheel 24 (and similarly on the rods L and L²) near one end, and another similar gear wheel 24$^a$ near the other end; the gear wheel 24 being in mesh with and driven by the gear wheel 23, and the gear wheel 24$^a$ being in mesh with and driven by the gear wheel 23$^a$.

The train of gears I, 23, and 24 is shown in detail in Figs. 13 and 14, and here, as in Fig. 4 it will be seen that the inner faces of the gears 23 and 24, and the inner faces also of the gears 23$^a$ and 24$^a$ are provided with a series of circular recesses 42, which receive the ends of the journals of the stripping and separating rollers and support them loosely so that they may each have a free independent reverse rotation of its own, as already stated. On the rod K′, near the gear wheel 23, is a washer or spacing sleeve 25. On the rod near the other end next to the gear wheel 23$^a$ is a similar washer or spacing sleeve 25$^a$ pinned to the rod. Next to the sleeve 25 is a ring or sleeve 26, and next to the washer or sleeve 25$^a$ is a ring or sleeve 26$^a$. Inside of each sleeve 26 and 26$^a$ is a series of rollers or balls 45, see Figs. 4 and 5, so that these sleeves 26 and 26$^a$ are revoluble on the rod K′. Adjoining the sleeves 26 and 26$^a$ are collars 46 pinned rigidly to the rod K′. Tie rods 41 connect the members of the pairs of gears 23 and 23$^a$ with each other, as also the members of the pairs of gears 24 and 24$^a$, and these rods are provided with suitable screw-threaded ends and nuts to be screwed up tightly against the gears, thus firmly binding all parts together into a compact combination after the rollers have been put into place. On the rod L′, next to the gear 24, I place a washer 40, and next to the gear 24$^a$ a washer 40$^a$. These washers 40 and 40$^a$ are thinner ordinarily than the rollers or spacing sleeves 25, 25$^a$ in order to allow the friction rings on the rollers of the lower set to be situated more closely to the supporting and driving gears, and hence out of conflict with the similar friction rings of the rollers of the upper set. Next to the washers 40 and 40$^a$ are the rings 44 and 44$^a$, and next to these the stationary collars 46 which serve to hold all the parts in place. Said rings 44 and 44$^a$ have within them series of rollers or balls 45 similar to the rollers or balls within the rings 26 and 26$^a$ which surround the rod K′. The gears 24 and 24$^a$ are also held together by means of tie rods 41, see Fig. 4. It must be understood of course that in each of the roller mechanisms A, B and D is to be found vertical chains of gears arranged and operating as I have just been describing.

Continuing to describe the parts shown in section in Fig. 4, which is on the line $v$ $v$ of Fig. 3, and bearing in mind that the arrangement of the parts, with the exception of certain modifications in the surfacing of the rollers is a duplicate of the roller mechanisms A and D, it will be seen that alongside the gear wheel 23 is a stationary circular casing 27, supported in a vertical position by means of horizontal bolts 28 that are screwed at one end into the frame 2$^b$, and near the other end are provided with a collar 30 and with a clamp nut 29 in order that the casing 27 may be securely held thereby. One of the casings 27 is shown in side view in Fig. 16 and in cross section in Fig. 17. A second corresponding casing 27$^a$ is situated opposite to the casing 27 adjacent to the gear wheel 23$^a$, but in a reverse position. Similarly alongside of the gear wheel 24 is a casing 34, and alongside of the gear wheel 24$^a$ a casing 34$^a$, these casings 34 and 34$^a$ being substantially alike, except that they are reverse to each other and are duplicates of the casings 27 and 27$^a$. Inside of each of these four casings is a friction ring 31, shown in side view in Fig. 20 and in cross section in Fig. 21, being beveled on the outside edge and having an inner surface parallel to the axis. Between the friction ring 31 and the surrounding casing 27 is a clamping ring 32, one edge of which is beveled to correspond to the bevel of ring 31, while the other is straight to correspond to the inside circular surface of the casing, and bolts 33 are employed at several points to pass through the rings 32 and the casing for the purpose of clamping these beveled rings 32 tightly against the friction rings 31, the latter being split rings, as shown in Fig. 21 and hence more or less contractible, so that in case any wear occurs the parts may be adjusted. On the inside faces of the friction rings 31 the friction surfaces of the rollers rotate for the purpose of actuating said rollers and causing them to revolve on their axes.

Supported in the recesses 42 of the gear wheels 23, 23$^a$ is the series of rollers $b$ and $c$, shown in section in Fig. 3, the rollers $b$ being provided with circular parallel grooves and intervening ribs or with screw threads, and the rollers $c$ being plain, the series preferably consisting of ten rollers and alternating, first a roller $b$, then a roller $c$. Each roller $b$ and $c$ is provided, near each end, with a journal 36 on which is a friction wheel, ring, collar, or other surface 37, preferably enlarged so as to be of somewhat larger diameter than the journals 36, and these friction wheels are in contact with the inside surfaces of the friction rings 31 for the purpose of causing the rollers to rotate as the rollers are carried around in contact with these friction rings. The recesses 42 in the gear wheels 24 and $24^a$ similarly receive and support the journals 36 of the rollers $b'$ and $c'$, the rollers $b'$ being grooved similarly to the rollers $b$ and the rollers $c'$ being plain, and on these journals 36 of the lower rollers $b'$, $c'$ are friction rings or wheels $37^a$ identical with the friction rings 37, except that they are located nearer to the ends of the journals 36, so as to lie in a different vertical plane from the friction wheels 37, and therefore out of conflict therewith during the revolution of the rollers. Each roller couple therefore in the mechanism B consists of a smooth roller and a corrugated or grooved roller in contact with each other. Between the revolving rings 26, $26^a$, 44, $44^a$ and the adjacent friction rings or surfaces 37, $37^a$ of the various rollers, I insert small intermediate loose rolls 43 which are kept from slipping out endwise by lying between the flanges of the washers or collars 25 and 46 and $25^a$ and $46^a$, etc. These intermediate rolls 43 operate like a roller or ball-bearing and promote the ease of revolution of the rollers. Hence it will be seen that the stripping or decorticating rollers are actuated by the frictional contact of their friction rings 37 and $37^a$ within the surrounding rings 31, while on the other side are the anti-friction rollers 43 insuring ease and speed in the action of the rollers. In roller mechanism A the rollers $a$ are supported in like manner in the gear wheels or gear frames at the ends of the rollers, and the latter rollers are individually and serially actuated in the same manner as in roller mechanism B. These rollers $a$ are all of the same character, as are also the lower rollers $a'$, being all grooved or threaded, and in this mechanism A the grooves or thread on the rollers preferably do not interlock, but simply come nearly into contact as is shown in the sectional view of one of the roller couples of mechanism A indicated in Fig. 12, which is taken on the line $u$, $u$ of Fig. 3. In the roller mechanism D the rollers $d$ are supported and driven in like manner as in roller mechanisms A and B, the rollers $d$ being preferably covered with rubber or some other yielding material which is grooved, and the same being the case with the rollers $a'$ and rollers $d$ and $d'$ interlocking with each other. The relation of the surfaces of a roller couple consisting of a roller $d$ and a roller $d'$ is shown in Fig. 11, which is a sectional view taken on the line $w$, $w$ of Fig. 3. It is found in actual experience that rubber is an excellent material for the surface of stripping rollers, and that by grooving or threading the surface as indicated in Fig. 11, good results are obtained. One reason is because the yielding edges can interlock to a greater or less extent, with the fiber between them, and thus produce the desired effect on the fiber without injury to the yielding ribs; and also does not injure the fiber, and assists in making the separation more complete.

The pulley 6 on the shaft 3 of the upper feed roller connects with the pulley 17 on the shaft 11 of the upper squeeze roller by means of a belt 67, see Fig. 1. The pulley 21 on the end of the shaft E which drives roller mechanism A connects with the pulley 22 on the shaft F of roller mechanism B by means of a belt 66; and said pulley 22 or a companion on the same shaft alongside it connects by a belt 65 with the pulley 20 on the shaft G, which actuates the roller mechanism D. In the base of the frame 1 are journaled a main driving shaft 69, having thereon a main driving pulley 71, and a parallel countershaft 70. A twisted belt 74 passes around a pulley 72 on shaft 69 and a pulley 73 on shaft 70 whereby motion is communicated from shaft 69 to shaft 70, and thus the latter shaft may revolve in a direction the reverse of the former, see Figs. 1 and 2. On the end of shaft E, opposite to where pulley 21 is located is carried a pulley 75 and a belt 76 runs from pulley 75 to a pulley on the main shaft 69. Likewise a belt 68 runs from the pulley 17 on the shaft 11, or a companion pulley alongside of pulley 17, downwardly to a pulley 82 upon the shaft 70 whereby power is transmitted from shaft 70 to the squeeze couple. Thus it will be seen that power applied to the pulley 71 will drive the two shafts 69 and 70; whereby shaft 69, through the belt 76 will actuate the roller mechanisms A, B and D; and whereby shaft 70, through belt 68, will actuate the squeeze couple which is belted to drive the feed couple. Instead of belts, chains or other suitable connections may be employed, and instead of pulleys, sprocket wheels engaging the chains or other revolving devices may be substituted, and I reserve the liberty of using any driving connections for the different parts which may be found most advantageous.

The material which is to be acted upon is first fed into the machine at the left hand end in the direction shown by the arrow in Fig. 3. When it leaves the feed couple it passes to the table 64 whence it is delivered direct to the roller mechanism A which begins the stripping operation. The leaves are partly decorticated in mechanism A, that is to say, the fiber strands are partially formed, the leaves being cut into shreds for a certain distance, though not completely, and the partially formed fiber is delivered from the roller mechanism A onto an endless apron or conveyer 47, supported and driven by means of horizontal rollers 48, 48. This conveyer 47 carries the material forward to the roller mechanism B. Between the conveyer 47 and the roller mechanism B I find it convenient to insert a stationary box 83 having a perforated surface 84, through which air, water, steam or other fluid or liquid may be supplied to act against the material and assist in directing it between the rollers of mechanism B. Situated above the air box 83 is a tube 85 perforated at 86 and designed to serve as either a water tube or an air tube for supplying air or water to help in handling the fiber. When the fiber leaves the roller mechanism B it is delivered upon an endless conveyer or apron 49, supported and driven by a pair of rollers 50. This conveyer takes the material and carries it to the squeeze couple. Between the conveyer 49 and the squeeze couple is another perforated air box 58. Above the conveyer is a tube 55 having perforations 56 and serving, either for a water or an air supply. Above the air box 58 is a perforated tube 57 for the delivery of air or water. These tubes are simply given by way of example in order to illustrate means for supplying air and water to assist in properly forwarding the fiber through the machine. When the fiber leaves the squeeze couple it passes to another endless apron or conveyer 51, supported and driven by a pair of rollers 52.

59 denotes an air box alongside of the squeeze couple and supplying a suitable draft of air to feed the material from the squeeze couple to the conveyer 51. Between conveyer 51 and roller mechanism D is another air box 61 perforated at 63, above which is a tube 60 perforated at 62; also at the right of the roller mechanism D is an endless conveyer or apron 53, supported and driven by parallel rollers 54, which receives the material after its final action in the roller mechanism D and carries it out of the machine for such other operations as it may be given to. I am at liberty to use air, water, steam, or any other liquid or fluid in the pipes or boxes I have just described.

One of the rollers 48 of the conveyer 47 is provided with a pulley 78 around which passes a belt 77, that also passes around and is driven by a pulley 90 on the end of the shaft F. In this way power is derived from one of the roller mechanism shafts to actuate the conveyers. On shaft 48, alongside of pulley 78 is a pulley 88, which connects by a belt 79 with a pulley 80 on roller 50, which is one of the rollers of the conveyer 49. On roller 50 is also a pulley 89 which connects by means of a belt 81 with roller 52, which is one of the rollers of the conveyer 51.

The operation of this machine proceeds in such a way that there is an extremely small amount of friction on the plants or fibers. Only enough friction occurs as may be necessary to assist in feeding the fiber from one mechanical operation to the next. My aim is to get rid of all friction except the small amount needed to carry the leaf from one position to another. The rollers all have a series revolution in one direction, and an individual revolution in a reverse direction, and hence each roller couple when acting on the fiber consists of two rollers rotating backwardly, although the bodily movement of each roller is forwardly. This backward movement of the rollers relieves the fiber of the friction which would exist if this movement were omitted and each roller simply had a forward movement due to its series revolution. This is a feature of extreme importance for when friction exists the leaf is apt to be torn and badly damaged and the resulting strands are cut and seriously injured, but by introducing the feature of the double revolution and thereby dispensing with all except a very slight amount of this frictional action the leaf is kept in the best possible condition for the stripping action, and when this latter action occurs the strands or fibers are cut neatly and carefully and the product of the machine is of a very high order and adapted for the various uses to which it is put. All serious damage is obviated and the material is finished in a highly perfected state, for the separation of the fiber strands is made without undue strain or wear on them.

Having thus described my invention, what I claim as new and desire to secure by Letters Patent, is:

1. In a decorticating machine, the combination of a feed device, a squeeze device, and a stripping mechanism consisting of a circular series of rollers having a revolution in series and each an individual reverse revolution and a second co-operating circular series of rollers, all the rollers being positively actuated and arranged so that the roller couples may separate the fiber.

2. In a decorticating machine, the combination of a feed device, and a plurality of roller stripping mechanisms, each mechanism consisting of a circular series of rollers having a serial revolution and an individual revolution, and a second co-operating similar circular series of rollers having a serial revolution and an individual revolution, all the rollers of the different series being positively actuated and the individual revolution being reverse to that of the serial revolution, the fiber being passed from one roller mechanism to the next in series until the operation is complete.

3. In a decorticating machine, a plurality of roller stripping mechanisms, each consisting of a circular series of rollers having a serial revolution and an individual revolution, and a co-operating similar circular series of rollers co-acting therewith and having a serial revolution and an individual revolution, all the rollers of the different mechanisms being positively actuated, and the individual revolution of each roller being reverse to that of the serial revolution, and the rollers of the different mechanisms differing only in respect to their surfaces, some being grooved, some plain, and the grooves of some differing from the grooves of others.

4. In a decorticating machine, the combination of a roller mechanism consisting of a circular series of rollers having a revolution in series and individually, and a second co-operating similar circular series of rollers, the rollers of both series being positively actuated and all being grooved, a second roller mechanism consisting of a circular series of rollers having a double motion and a co-operating series of similar rollers, the rollers of this second mechanism being alternately grooved and plain, and a third roller mechanism consisting of a circular series of rollers having a double motion and a co-operating circular series of similar rollers, all the rollers of this third mechanism being yielding and grooved so as to be capable of engaging with each other.

5. In a decorticating machine, the combination of a feed couple, a plurality of stripping mechanisms each consisting of a circular series of rollers positively actuated with a double motion and a co-operating circular series of similar rollers, and a squeeze couple, together with means for delivering the material from one roller mechanism to the other throughout the machine.

6. In a decorticating machine, the combination of a feeding couple, a plurality of roller stripping mechanisms each consisting of a circular series of rollers positively actuated with a double motion, and a co-operating similar circular series of rollers, a squeeze couple, and conveyers for carrying the material from one roller mechanism to the other and to the squeeze couple.

7. In a decorticating machine, the combination of a feeding couple, a plurality of roller mechanisms each consisting of a circular series of rollers positively actuated with a double motion and a co-operating similar series of rollers, conveying devices for carrying the material from one roller mechanism to the action of the next, a squeeze couple for crushing the material delivered thereto from the adjacent roller mechanism, and another roller mechanism similar to the others for imparting a final stripping operation.

8. In a decorticating machine, the combination of a feeding couple, a roller mechanism consisting of a circular series of grooved stripping rollers positively actuated with a double motion and a co-operating circular series of similar grooved rollers, the edges of the ribs of each roller couple nearly touching when in action, a second roller mechanism consisting of a circular series of rollers positively actuated with a double motion, every alternate roller being plain and every alternate roller being grooved, and a co-operating series of similar alternately plain and grooved rollers, so that each roller couple consists of one plain and one grooved roller, a squeeze couple consisting of an upper and a lower roller for receiving the material from the adjacent roller mechanism, and a final roller mechanism consisting of a circular series of rollers positively actuated with a double motion, the rollers having a yielding surface and grooved, and a co-operating circular series of yielding grooved rollers, so that the grooves in the rollers of each couple may interlock when in action.

9. In a decorticating machine, a circular series of grooved stripping rollers positively actuated with a double motion, and a similar circular series of grooved stripping rollers co-acting therewith and likewise positively actuated with a double motion, revolving frames in which the ends of the rollers are journaled, a stationary rod on which the frames revolve, and stationary casings within which friction rings on all the rollers act to impart an individual rotation to each roller which is the reverse of the serial revolution of the rollers.

10. In a decorticating machine, a circular series of grooved stripping rollers positively actuated with a double action, and a co-operating circular series of similar grooved stripping rollers, providing roller couples which strip the fiber, revolving frames in which the ends of the rollers are journaled, friction rings or surfaces on the rollers, stationary casings surrounding the friction rings, removable friction rings within and against which the roller frictions act, and bevel clamping rings for holding the latter friction rings in position within the casings.

11. In a decorticating machine, a circular series of grooved stripping rollers positively actuated with a series and an individual motion, the latter being the reverse of the former, and a similar circular series of grooved stripping rollers positively actuated with a series and an individual motion, the latter being the reverse of the former, revolving frames in which the ends of the rollers are journaled, said frames having gear teeth, means for connecting the frames together, a stationary rod on which the frames revolve, stationary casings, and friction rings on the rollers, which rings operate within the casings.

12. In a decorticating machine, a circular series of grooved stripping rollers positively actuated with a series and an individual motion, the latter being the reverse of that of the former, to avoid friction on the material, and a similar circular series of grooved stripping rollers coacting therewith, a stationary rod, revolving frames in which the ends of the rollers are journaled, said frames revolving on said rod, revolving rings on the rod, stationary casings, friction surfaces on the rollers which operate against the rings to revolve the rollers, and a series of rollers between said friction surfaces and the revolving rings.

13. In a decorticating machine, a circular series of grooved stripping rollers positively actuated with a series and an individual motion, and a second similar circular series of grooved stripping rollers co-acting therewith, revolving frames in which the ends of the rollers are journaled, said frames being provided with gear teeth, a stationary rod on which the gear frames revolve, stationary casings within which friction surfaces on all the rollers operate to impart a rotation to the rollers, revolving rings on the stationary casings, and a series of rollers in the same line between the roller friction surfaces and the revolving rings, together with means on the stationary rod for keeping the revolving rings and the rollers in correct alinement.

14. In a decorticating machine, a circular series of grooved stripping rollers positively actuated with a series and an individual motion and a second similar circular series of grooved stripping rollers co-acting therewith, gear wheels in which the ends of the rollers are journaled, a stationary rod on which the gear wheels revolve, stationary casings, removable friction rings within said casings friction surfaces on the rollers act against the friction rings to rotate the rollers, beveled clamping rings for holding the removable friction rings in position, revolving rings on the stationary rod, a series of loose rollers between said revolving rings and the friction surfaces on the stripping rollers, and means for keeping the revolving rings and the loose rollers in correct alinement 15. In a decorticating machine, a circular series of grooved stripping rollers positively actuated with a series and individual motion, the latter being the reverse of the former, and a second similar series of grooved stripping rollers co-acting therewith, gear wheels in which the ends of the rollers are journaled, a stationary rod on which the gears revolve, tie devices for holding the gears together, stationary casings, friction rings in said casings, friction surfaces on the rollers acting to rotate the latter, clamping rings for holding the friction rings in casings, and a series of loose rollers between the stationary rod and the roller friction surfaces, for contributing to the ease of movement of the rollers.

16. In a decorticating machine, the combination of a feed couple, a plurality of stripping mechanisms each consisting of a circular series of rollers and a co-operating second circular series of similar rollers, all of the rollers having a double motion, one the reverse of the other, a squeeze couple, and means for supplying air pressure to deliver the material from one operation to the next.

17. In a decorticating machine, the combination of a feed couple, a roller mechanism whose rollers have a double motion, a second roller mechanism co-acting with the first mechanism whose rollers have a double motion, means for conveying the material from the first roller mechanism to the second, means for supplying fluid or liquid pressure for facilitating the passage of the material from one mechanism to the next, and means for treating the material after it leaves the second roller mechanism.

Signed at New York city this 21st day of December 1905.

CHARLES NORMAN DAVIS.

Witnesses:
JOHN H. HAZELTON,
I. HEIBERG.